A. CLEMENT.
ENGINE MOUNTING FOR AIRSHIPS.
APPLICATION FILED FEB. 6, 1909.

1,000,494.

Patented Aug. 15, 1911.

2 SHEETS—SHEET 1.

Witnesses:
Fred White
René Bluine

Inventor
Adolphe Clément,
By Attorneys,

A. CLÉMENT.
ENGINE MOUNTING FOR AIRSHIPS.
APPLICATION FILED FEB. 6, 1909.
1,000,494.
Patented Aug. 15, 1911.
2 SHEETS—SHEET 2.
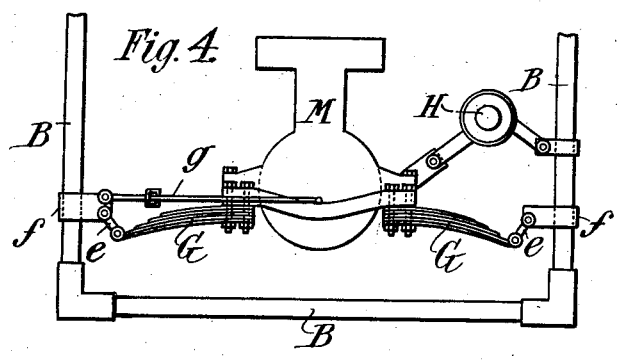
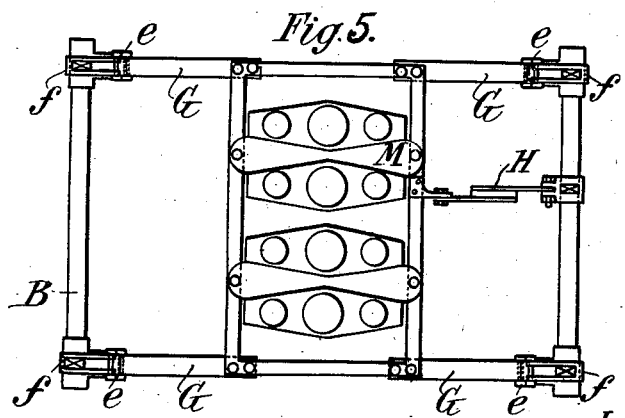

UNITED STATES PATENT OFFICE.

ADOLPHE CLÉMENT, OF LEVALLOIS-PERRET, FRANCE.

ENGINE-MOUNTING FOR AIRSHIPS.

1,000,494.  Specification of Letters Patent. Patented Aug. 15, 1911.

Application filed February 6, 1909. Serial No. 476,514.

*To all whom it may concern:*

Be it known that I, ADOLPHE CLEMENT, a citizen of the Republic of France, residing in Levallois-Perret, Seine, France, have invented certain new and useful Improvements in Engine-Mounting for Airships, of which the following is a specification.

In an air vehicle, such as a dirigible balloon or an aeroplane the vibration caused by the running of the motor may be very great owing to the fact that the mass of the car is very small; it is well known that the vibrations communicated by a moving mechanism to its support are inversely proportionate to the mass of this support. Now as in a dirigible balloon or an aeroplane the mass of the car must not be increased but on the contrary attempts must be made to reduce it as much as possible, it is of the greatest importance that the vibrations of the motor should not be communicated to the car. It should be noted that these vibrations are of two kinds; there are first of all the shocks arising from the sudden variation of the motor couple, which arises when an explosion motor misses fire, and then the vibrations produced by the imperfect balancing of the motor, these latter vibrations taking place continuously in normal running.

The system which forms the subject of this invention has for its object to reduce or even eliminate these various defects almost completely. It consists in absorbing or deadening these shocks and vibrations by elastic means which may be variously arranged, several embodiments being illustrated in the accompanying drawing.

The accompanying drawings illustrate embodiments of the invention.

Figure 1:
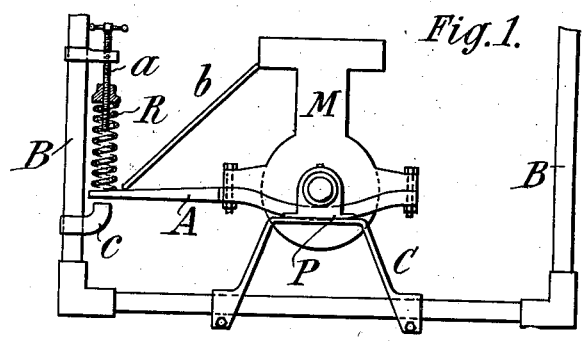
Figure 2:
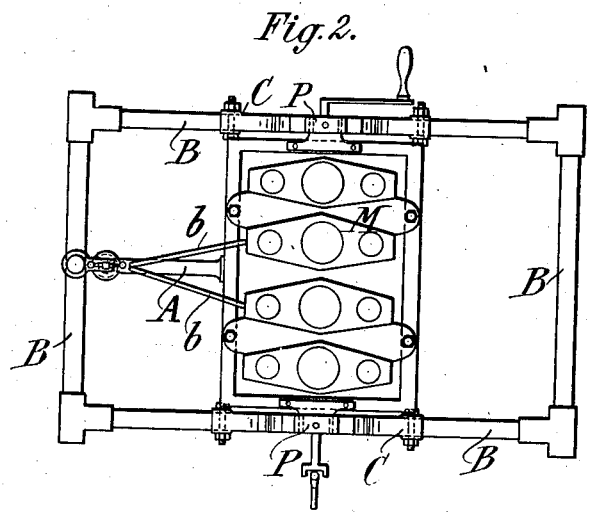
Figure 3:
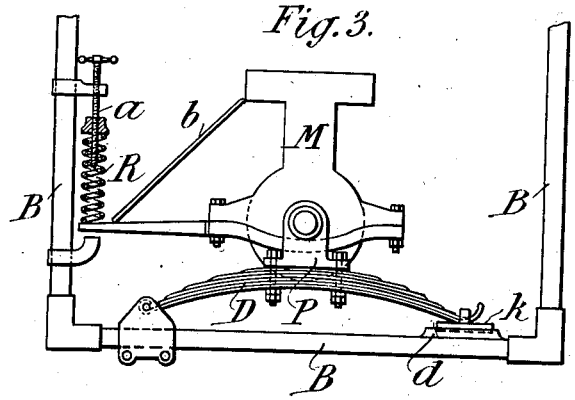

Figures 1 and 2 are respectively an end view and plan of one form of the apparatus; Fig. 3 is an end view of another form; Figs. 4 and 5 are respectively an end view and plan of a third form.

The device represented in side elevation in Fig. 1 and in plan in Fig. 2 is sufficient for diminishing the shocks due to the variations of the couple of motors with 6 or 8 cylinders, the balancing of which is almost perfect and which consequently transmit hardly any vibrations. This means consists in supporting the motor M by two bearings P concentric with the axis of the crank shaft. These bearings are fixed to the motor itself or to a frame C supporting the motor. An arm A rigidly connected with the whole is connected with the fittings B of the car through the intermediation of a spring R the tension of which can be regulated in accordance with requirements by means of a screw threaded rod *a* provided with a hand wheel or a crank. This spring R yields under the influence of the motor couple. It may be pointed out that the flexure of this spring might serve for the measurement of this motor couple which might be useful for certain experiments. The arm A is firmly connected with the motor by rigid rods *b* and rests upon the projection *c* when the motor is not running.

When the motor comprises a smaller number of cylinders, such as four for example, so that the balancing is less perfect, it is desirable to interpose (as shown in a modification illustrated in Fig. 3) springs D between the supports of the bearings P and the frame B of the car, these springs absorbing the constant vibration of the motor during its normal running which vibrations arise from defective balancing. In order that the springs thus interposed between the bearings and the parts of the frame of the car may be exceedingly flexible and capable of easy play, it is advisable to provide one of the free ends of these springs with a shoe *k* which rests on a slide-way *d* permitting of free displacement; the other end of the spring is fixed in a lug. If found advantageous, movable shoes might be provided at both extremities of the springs.

Figs. 4 and 5 represent in side elevation and in plan an arrangement in which the motor is carried by a chassis which, instead of resting on the car, rests upon leaf springs G the ends of which are connected by jointed yoke-pieces *e* to fittings *f* firmly fixed on the uprights of the framework. By means of this arrangement the shocks arising from misfiring and vibrations occurring in normal running are both absorbed. It is likewise possible to keep the center of the motor in a zone enabling a controlling movement to be exerted upon it from an auxiliary apparatus by means of a connecting rod *g* which is adjustable in length.

When plate springs are used as shown in Figs. 3 and 4, the braking action arising from the friction of the plates one upon the other is utilized, thereby rendering the flexures aperiodic as far as possible.

It is also possible to arrange at any suitable place shock absorbing devices utilizing friction, a liquid, air or other appropriate means, as indicated diagrammatically in Fig. 4 at H, for the purpose of perfecting the aperiodicity if necessary.

What I claim and desire to secure by Letters Patent of the United States is:—

1. The combination of a motor frame of an air vehicle, with a motor carried by said frame, said motor having a shaft, bearings for said shaft concentric therewith and connecting the same to said frame, and an additional connection between said motor and frame comprising an arm on the motor and a buffer spring between the end of said arm and a part of said frame for absorbing shocks due to variations in the motor couple.

2. The combination of a motor frame of an air vehicle, with a motor carried by said frame, said motor having a shaft, bearings for said shaft concentric therewith and connecting the same to said frame, and an additional connection between said motor and frame comprising an arm on the motor and a buffer spring between the end of said arm and a part of said frame for absorbing shocks due to variations in the motor couple, and means for regulating the strength of said spring.

3. The combination of a motor frame of an air vehicle, with a motor carried by said frame, a shaft for said motor, bearings for said shaft, and leaf springs connecting said bearings with said frame, an arm on the motor, and a buffer spring between said arm and said frame for absorbing shocks due to variations in the motor couple.

4. The combination of a motor frame of an air vehicle, with a motor carried by said frame, a shaft for said motor, bearings for said shaft, leaf springs connecting said bearings with said frame, an arm on the motor, and a buffer spring between said arm and said frame for absorbing shocks due to variations in the motor couple, and means for adjusting the strength of said spring.

In witness whereof, I have hereunto signed my name in the presence of two subscribing witnesses.

ADOLPHE CLÉMENT.

Witnesses:
   JULES ARMENGAUD, Jeune,
   ELLWOOD AUSTIN WELDEN.